United States Patent Office 3,550,454
Patented Dec. 29, 1970

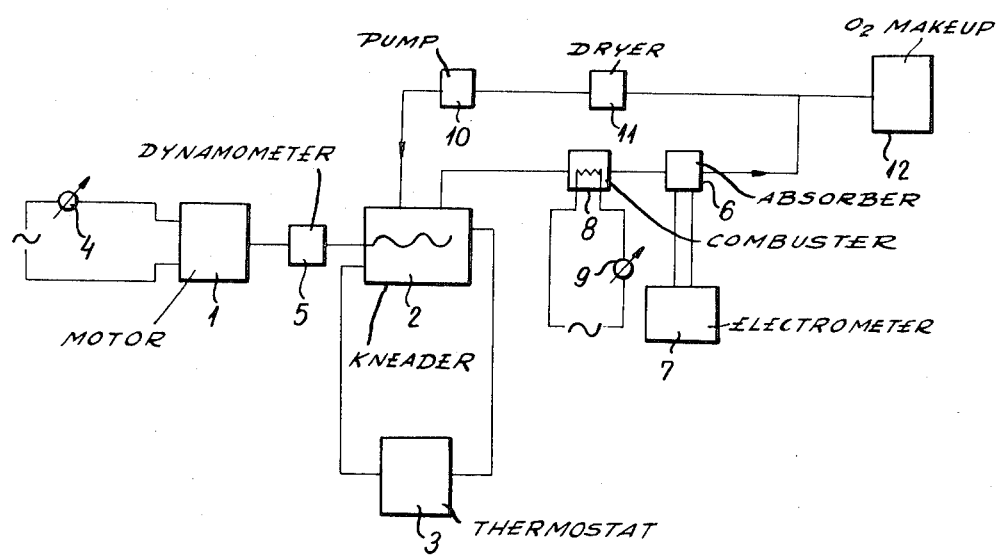

3,550,454
APPARATUS FOR TESTING THE THERMOOXIDA-
TION OF MACROMOLECULAR PLASTIC AND
ELASTIC MATERIALS
Zoltán Wolkober, Éva Wolkober, Gábor Bazsika, and
László Miskolczy, Budapest, Hungary, assignors to
Muanyagipari Kutato Intezet and Hungaria Muany-
agfeldolgozo, Vallalat, both of Budapest, Hungary
Filed Sept. 3, 1968, Ser. No. 757,001
Claims priority, application Hungary, Sept. 4, 1967,
Mu 384
Int. Cl. G01n *31/00, 33/44*
U.S. Cl. 73—432
3 Claims

ABSTRACT OF THE DISCLOSURE

An apparatus or examining the thermo-oxidative properties of elastomers and for determining the effect on thermostability of various additives and for determining the changes in mechanical force required for kneading the said elastomers. The apparatus comprises a kneading unit hermetically sealed off from the atmosphere, provided with a thermostat and fitted with a gas inlet and outlet, a motor for driving the kneading unit, means for determining the mechanical force between the motor and the kneading unit, a thermostat connected with the kneading unit, means connected to the gas inlet of the kneading unit for causing the gas to flow, electrometric means electrically coupled to the said absorbing means for measuring the changes of concentration occurring during the testing, gas-drying means connected by tubes to the gas-circulating device and to said absorbing means, and means, connected to the apparatus, automatically replacing the oxygen, used up by oxidation, to the extent corresponding to the course of the thermomechanical reaction.

---

The invention relates to an apparatus for testing the thermooxidation stability of macromolecular plastic and elastic materials.

It is known that the thermomechanical processing of plastic and elastic materials (hereinafter: elastomers) in the presence of air involves oxidation and decomposition processes. As a result of the ensuing physical and chemical changes, the elastomers are discoloured, decomposition products are formed, the macromolecular chains are first discoloured, then interlinked, in the course of which processes partial reticulation takes place. These processes are fundamentally influenced by the various components of the system, such as softeners, slip-promoters, fillers, stabilizers, colouring agents, pigments and the like.

A thorough knowledge of the processes occurring during thermomechanical strain is extremely important since the great majority of elastomers is processed by thermo-mechanical methods. The chemical processes which take place under the effect of thermomechanical strain not only damage the mechanical characteristics of the product, but considerably impair the photostability and thermostability of the product as well. Accordingly, one of the most important problems connected with the processing of elastomers is to make an appropriate choice of those additives which are apt to afford the maximum protection against thermomechanical damage.

The most widely known apparatus for the testing of processes taking place in the processing of plastics is that developed by Brabender and generally known as a plastograph, a device which permits determination, simultaneously with subjecting the sample to thermomechanical strain, the force required for mechanical kneading, and the changes which said force undergoes as a function of time. If the stability of the test samples decreases and decomposition as well as reticulation appear, the force required for thermomechanical kneading increases. Thus it becomes possible to obtain data on the stability of the test sample by determining certain physical characteristics.

It is obvious that the changes occurring in elastomers under the thermomechanical strain are due to chemical reactions. It is common knowledge that in the processing of polyolefines, for example, the mechanical characteristics of the product are considerably deteriorated after the uptake of 1 thousandth of oxygen. The situation is very similar with PVC systems. The splitting-off of even a small amount of HCl leads to discolouring, to a deterioration of the mechanical characteristics, and ultimately to a drop in the photooxidation stability of the product.

In the course of thermomechanical processing essentially a twofold reaction takes place. On the one hand, the oxygen of the air reacts with the plastic system—with or without the formation of decomposition products—and on the other hand, the elastomer undergoes changes caused by intramolecular or intermolecular reactions. To be able to measure the extent of oxidation taking place in the course of thermomechanical treatment is of especial importance in view of the largely accepted assumption that decomposition and degradation connected with the appearance of decomposition products take place at a much higher speed in the presence of oxygen than otherwise. Said oxidation may, however, be significantly reduced by a suitable choice of the additives. None of the known conventional apparatuses is capable of performing such measurements.

In the course of testing the thermomechanical stability of elastomers it has been surprisingly found that it is possible to determine simultaneously the effect of oxygen on elastomeric systems under thermomechanical strain and, if required, also the changes in force required for thermomechanical processing, if oxygen is circulated in a closed cycle over the thermostated test sample in the absence of air.

The object of the invention is an apparatus for examining the thermo-oxidative properties of elastomers and for determining the effect on thermostability of various additives and for determining the changes in mechanical force required for kneading the said elastomers, comprising a kneading unit hermetically sealed off from the atmosphere provided with a thermostat and fitted with a gas inlet and outlet, a motor for driving the kneading unit, means for determining the mechanical force between the motor and the kneading unit, a thermostat connected with the kneading unit, means connected to the gas inlet of the kneading unit for causing the gas to flow, means for absorbing gas from the outlet of the keading unit, electrometric means electrically coupled to the said absorbing means for measuring the changes of concentration occurring during the testing, gas-drying means connected by tubes to the gas-circulating device and to said absorbing means, and means, connected to the apparatus, automatically replacing the oxygen, used up by oxidation, to the extent corresponding to the course of the thermomechanical reaction.

In a preferred embodiment, the apparatus according to the invention comprises means for determining the mechanical force required for kneading. A further preferred embodiment of the apparatus according to the invention comprises means connected to the gas outlet of the kneading unit suitable for the combustion of organic decomposition products, and means connected to the said combustion means for absorbing the decomposition products.

The apparatus according to the invention makes it possible to determine the oxidation and other chemical processes of small extent but major importance which take place during thermomechanical treatments. These chemical processes precede the changes occurring in the viscoelastic properties of the system under test, and permit measurements of higher precision than does the earlier-mentioned plastograph, by which only the extent of change in force required for plastification can be determined.

The apparatus according to the invention makes it possible to determine the effects of auxiliary agents and stabilizers used in elastomers on thermooxidation and thermodegradation, as well as their influence on the amount of force required for the thermomechanical kneading of elastomers.

It is of particular significance that the apparatus according to the invention makes it possible to determine the chemical stability of the system to be tested under thermomechanical strains. Owing to the fact that conventional processes are only suitable for examinations carried out under static conditions, the data furnished by them cannot be directly applied to the evaluation of stability of dynamic nature.

A preferred embodiment of the apparatus according to the invention and the operation thereof are described with reference to the attached drawing.

The drawing is a flow diagram comprising certain equipment too, which though not necessarily forming integral parts of the apparatus, may be useful if one wishes to extend the scope of the investigations.

Oxygen of 99% purity, or air free from impurities is circulated in a pipeline of small diameter over a thermostated kneading unit 2 by means of the conveyor pump 10 supplying adjustably 100 to 1000 ml. of gas per hour. The temperature of said unit may be kept at a constant value by means of a thermostat 3, or if desired increased at a uniform rate expediently in the range of 50 to 250° C. The kneading unit has a volume of 10 to 100 ml. and is hermetically sealed off from the atmosphere. It is provided with a gas inlet and a gas outlet. The shaft of the rotor of the motor 1 is coupled to the kneading arm of the kneading unit through the means 5 measuring the uptake of mechanical force. An ampere-meter 4 measuring the power input is coupled to the electric circuit of the motor. A combustion apparatus 8 is connected to the gas outlet. The meter 9 serves for measuring the current intensity of the current flowing through the incandescent filament of the combustion apparatus 8.

The absorption vessel 6 serving to absorb the decomposition products produced as a result of thermomechanical strain is connected by a tube to the combustion apparatus 8. To the vessel 6 an electrometrical measuring unit 7 is electrically connected which permits to determine the changes in conductivity taking place in the vessel 6. The absorber-electrometer analyzer may take the form of those found in U.S. Pats. No. 3,001,917 and 3,031,272. The vessel 6 is connected by a pipe to a gas-drying device 11 which serves to bind the humidity of the gas circulating in closed cycle. The gas-drying device is connected by a pipe to the pump 10, which is connected by a tube to the gas inlet of the kneading unit 2. The oxygen-feeding means 12, also connected to the closed, tubing automatically replaces the oxygen consumed by thermooxidation.

The apparatus according to the invention is suitable for the simultaneous determination of the amount of decomposition products and of the oxidation taking place in connection with the thermomechanical processing of PBC, polyolefines, polystyrene, natural and artificial rubber, etc. It is also possible to simultaneously determine by it the changes occurring in the visco-elastic properties of the test sample in the presence of various additives, under different thermomechanical conditions.

A preferable embodiment of the apparatus according to the invention permits to determine the extent of oxidation and the amount of decomposition products at constant temperature, in the visco-elastic state of the test material, as a function of the quality or quantity of the auxiliary agents used, with simultaneous determination of the change in the visco-elastic properties.

Another advantageous embodiment of the apparatus according to the invention makes it possible to raise the temperature of the kneading unit in conformity with a predetermined programme, so as to determine the temperature at which thermooxidation and thermodegration induced by mechano-chemical forces commence. It is furthermore possible to simultaneously determine the optimum temperature of plastification of the test sample, and the changes taking place in the visco-elastic properties at elevated temperatures due to the instability of the system.

The apparatus according to the invention is a first one to permit the quantitative determination of chemical processes taking place under the effect of thermomechanical strain corresponding to natural conditions, as a result of which the properties of synthetics and other macromolecular products, thermoplastics and elastomers, and of the auxiliary agents required for their processing, can be evaluated in a more rapid and reliable manner than hitherto. On the basis of these data it is possible to establish the optimum composition and other technological conditions required for processing a given test system.

What we claim is:

1. An apparatus for examining the thermo-oxidative properties of elastomers and for determining the changes in mechanical force required for kneading the said elastomers, comprising a kneading unit hermetically sealed off from the atmosphere provided with a thermostat and fitted with a gas inlet and outlet, a motor for driving the kneading unit, means for determining the mechanical force between the motor and the kneading unit, a thermostat connected with the kneading unit, means connected to the gas inlet of the kneading unit for causing the gas to flow, means for absorbing gas from said outlet, electrometric means electrically coupled to the said absorbing means for measuring the changes of concentration occurring during the testing, gas-drying means connected by tubes to the gas-circulating device and to said absorbing means, and means, connected to the apparatus, automatically replacing the oxygen, used by the oxidation, to the extent corresponding to the course of the thermomechanical reaction.

2. An apparatus according to claim 1, comprising means for determining the mechanical force required for kneading.

3. An apparatus according to claim 1, comprising means connected to the gas outlet of the kneading unit for the combustion of organic decomposition products, and means connected to the said combustion means for absorbing gas from said combustion means.

References Cited

UNITED STATES PATENTS

| 2,771,777 | 11/1956 | Allison | 73—432 |
| 2,977,098 | 3/1961 | Watson | 18—2(EM) |
| 3,169,395 | 2/1965 | Enoch et al. | 73—59 |
| 3,212,319 | 10/1965 | Levy et al. | 73—59 |

S. CLEMENT SWISHER, Primary Examiner

U.S. Cl. X.R.

23—252